United States Patent
An et al.

(10) Patent No.: US 11,483,788 B2
(45) Date of Patent: Oct. 25, 2022

(54) DATA FRAME, DATA SENDING METHOD AND DEVICE

(71) Applicant: Hytera Communications Corporation Limited, Guangdong (CN)

(72) Inventors: Linfeng An, Guangdong (CN); Bao Guan, Guangdong (CN); Hengfu Liu, Guangdong (CN)

(73) Assignee: Hytera Communications Corporation Limited, Guangdong (CN)

( * ) Notice: Subject to any disclaimer, the term of this patent is extended or adjusted under 35 U.S.C. 154(b) by 335 days.

(21) Appl. No.: 16/646,401

(22) PCT Filed: Sep. 11, 2017

(86) PCT No.: PCT/CN2017/101183
§ 371 (c)(1),
(2) Date: Mar. 11, 2020

(87) PCT Pub. No.: WO2019/047203
PCT Pub. Date: Mar. 14, 2019

(65) Prior Publication Data
US 2020/0275396 A1 Aug. 27, 2020

(51) Int. Cl.
*H04W 56/00* (2009.01)
*H04L 5/00* (2006.01)
(Continued)

(52) U.S. Cl.
CPC ......... *H04W 56/004* (2013.01); *H04L 5/0048* (2013.01); *H04W 72/0446* (2013.01); *H04W 84/18* (2013.01)

(58) Field of Classification Search
CPC . H04W 56/004; H04W 72/04; H04W 72/044; H04W 72/0446; H04W 84/18; H04L 5/0048–0053
See application file for complete search history.

(56) References Cited

U.S. PATENT DOCUMENTS

| 2008/0232487 A1 | 9/2008 | Cleveland et al. |
| 2016/0309464 A1 | 10/2016 | Mukherjee et al. |

(Continued)

FOREIGN PATENT DOCUMENTS

| CN | 105792346 A | 7/2016 |
| CN | 107113832 A1 | 8/2017 |

(Continued)

OTHER PUBLICATIONS

First Office Action for Chinese Application No. 201710813632.3, dated Feb. 3, 2020.
Chang, The research of media access control strategy and packet traffic scheduling algorithm in wireless mesh networks. Chongqing University Thesis. Apr. 1-11, 2012.

(Continued)

*Primary Examiner* — Benjamin H Elliott, IV
*Assistant Examiner* — Prince A Mensah
(74) *Attorney, Agent, or Firm* — Wolf, Greenfield & Sacks, P.C.

(57) ABSTRACT

A data frame, a data transmitting method and a data transmitting device are provided. The data frame includes a set number of transmission time intervals each including at least two reference signal channels for transmitting pilot signals. A first transmission time interval of the set number of transmission time intervals further includes a control channel, a primary synchronization signal channel, a secondary synchronization signal channel, a broadcast channel, a shared channel and a guard time interval. Each transmission time interval other than the first transmission time interval further includes a control channel, a discovery signal channel, a shared channel and a guard time interval. A second slot of a last transmission time interval further includes a set number of access signal channels.

11 Claims, 4 Drawing Sheets

(51) Int. Cl.
*H04W 72/04* (2009.01)
*H04W 84/18* (2009.01)

(56) References Cited

U.S. PATENT DOCUMENTS

| | | | |
|---|---|---|---|
| 2016/0366576 A1* | 12/2016 | You | H04L 5/0094 |
| 2017/0164381 A1 | 6/2017 | Kim et al. | |
| 2019/0028252 A1* | 1/2019 | Akkarakaran | H04L 5/005 |
| 2020/0195400 A1* | 6/2020 | Wang | H04L 5/0048 |

FOREIGN PATENT DOCUMENTS

| WO | WO 2014/098401 A1 | 6/2014 |
|---|---|---|
| WO | WO 2015/147568 A1 | 10/2015 |

OTHER PUBLICATIONS

Qi et al., Analysis of IEEE 802.16 (WiMax) Mesh networking network. Data Communications, Provincial Key Laboratory of Mobile Communications, Southwest Jiatong University. 2005;4:34-6.
Zhao et al., 3GPP long term evolution: architecture and specification. People Post Press. Jan. 2010;79 pages.
Zhu et al., Research on PHY layer characteristic of IEEE 802.16 in mesh mode. Journal of Zhengzhou University of Light Industry. Dec. 2009;24(6):59-61.
International Search Report and Written Opinion for International Application No. PCT/CN2017/101183, dated Apr. 27, 2018.
PCT/CN2017/101183, Apr. 27, 2018, International Search Report and Written Opinion.
201710813632.3, Feb. 3, 2020, First Office Action.

* cited by examiner

▨ Statically allocated resources    ▨ Dynamically scheduled resources

Configuration 1 includes completely statically allocated resources, which can ensure time delay (for VoIP services and the like)

| T0 | T1 | T2 | T3 | T4 | T5 | T6 | T7 | T8 | T9 | T10 |

Configuration 2 includes a small number of dynamically allocated resources, which is mainly used for delay-sensitive services, and secondarily for some sudden services

| T0 | T1 | T2 | T3 | T4 | T5 | T6 | T7 | T8 | T9 | T10 | T11 | T12 | T13 | T14 | T15 | T16 | T17 | T18 | T19 |

Configuration 3 is used for both delay-sensitive services and sudden services

| T0 | T1 | T2 | T3 | T4 | T5 | T6 | T7 | T8 | T9 | T10 | T11 | T12 | T13 | T14 | T15 | T16 | T17 | T18 | T19 |

Configuration 4 is used mainly for sudden services

| T0 | T1 | T2 | T3 | T4 | T5 | T6 | T7 | T8 | T9 | T10 | T11 | T12 | T13 | T14 | T15 | T16 | T17 | T18 | T19 |

DATA FRAME, DATA SENDING METHOD AND DEVICE

This Application is a national stage filing under 35 U.S.C. § 371 of International Patent Application Serial No. PCT/CN2017/101183, filed Sep. 11, 2017. The contents of this application are incorporated herein by reference in its entirety.

FIELD

The present disclosure relates to the technical field of broadband MESH network communications, and in particular to a data frame, and a data transmitting method and a data transmitting device.

BACKGROUND

A wireless mesh network (MESH network) is established based on mutual cooperation and coordination among multiple wireless access points that are distributed in meshes. The MESH network is widely used due to its advantages of high-speed broadband and high spectrum efficiency, which provides one of key technologies for solving the problem of final access to wireless networks.

A pilot signal in a broadband MESH network signal may serve as a reference signal for synchronous positioning. The transmission of the pilot signal in the broadband MESH network can effectively improve a success rate of switching between different carrier frequencies, thereby ensuring a high mobility of the broadband MESH network. A node in the broadband MESH network acquires a channel estimation value based on the received pilot signal. However, in the conventional technology, based on a designed format of a data frame in the broadband MESH network and the single and fixed pilot signal, it may be considered that a channel value remains unchanged. In a case that a channel Doppler frequency shift is large, a channel estimation value acquired by a communication node based on a pilot signal in a header of a data packet is not accurate, resulting in a severely degraded performance of the broadband MESH network and a low mobility of the broadband MESH network.

SUMMARY

Based on the above weaknesses and deficiencies in the conventional technology, a data frame, and a data transmitting method and a data transmitting device are provided according to the present disclosure. By transmitting data using the data frame, multiple pilot signals can be transmitted in multiple symbols of one transmission time interval, so that a communication node can accurately acquire a channel estimation value, thereby improving network mobility.

The data frame according to the present disclosure includes a set number of transmission time intervals. Each of the set number of transmission time intervals includes at least two reference signal channels for transmitting pilot signals. In the set number of transmission time intervals, a first transmission time interval further includes a control channel, a primary synchronization signal channel, a secondary synchronization signal channel, a broadcast channel, a shared channel, and a guard time interval. Each transmission time interval other than the first transmission time interval further includes a control channel, a discovery signal channel, a shared channel and a guard time interval. A second time slot of a last transmission time interval includes an access signal channel.

In an embodiment, the reference signal channels in the last transmission time interval of the data frame occupy frequency resources in a first symbol and a fourth symbol of the last transmission time interval. The reference signal channels in each transmission time interval other than the last transmission time interval of the data frame occupy frequency resources in a first symbol, a fourth symbol, an eighth symbol and an eleventh symbol of the transmission time interval other than the last transmission time interval.

In an embodiment, reference signal channels of the data frame are arranged in a comb-shaped distribution.

In an embodiment, the control channel in the first transmission time interval occupies resource units other than the reference signal channel in the first symbol of the first transmission time interval. The primary synchronization signal channel occupies a frequency resource in a second symbol of the first transmission time interval. The secondary synchronization signal channel occupies a frequency resource in a third symbol of the first transmission time interval. The broadcast channel occupies a frequency resource in a sixth symbol of the first transmission time interval. The guard time interval in the first transmission time interval occupies a frequency resource in a last symbol of the first transmission time interval. The shared channel in the first transmission time interval occupies a frequency resource in a symbol remaining in the first transmission time interval. The control channel in each transmission time interval other than the first transmission time interval occupies resource units other than the reference signal channel in the first symbol of the transmission time interval other than the first transmission time interval. The discovery signal channel in each transmission time interval other than the first transmission occupies a frequency resource in a second symbol of the transmission time interval other than the first transmission time interval. The guard time interval in each transmission time interval other than the first transmission time interval occupies a frequency resource in a last symbol of the transmission time interval other than the first transmission time interval. The shared channel in each transmission time interval other than the first transmission time interval occupies a frequency resource in a symbol remaining in the transmission time interval other than the first transmission time interval.

In an embodiment, the control channel in the first transmission time interval occupies resource units other than the reference signal channel in the first symbol of the first transmission time interval. The primary synchronization signal channel occupies 72 resource units in the middle of a second symbol of the first transmission time interval. The secondary synchronization signal channel occupies 72 resource units in the middle of a third symbol of the first transmission time interval. The broadcast channel occupies 180 resource units in the middle of a sixth symbol of the first transmission time interval. The guard time interval in the first transmission time interval occupies all resource units in a last symbol of the first transmission time interval. The shared channel in the first transmission time interval occupies all resource units in a symbol remaining in the first transmission time interval. The control channel in each transmission time interval other than the first transmission time interval occupies resource units other than the reference signal channel in a first symbol of the transmission time interval other than the first transmission time interval. The discovery signal channel in each transmission time interval other than the first transmission occupies 72 resource units in the middle of a second symbol of the transmission time interval other than the first transmission time interval. The guard time interval in each transmission time interval other than the first transmission time interval occupies all resource units in a last symbol of the transmission time interval other than the first transmission time interval. The shared channels in each transmission time interval other than the first transmission time interval occupies all resource units in a symbol remaining in the transmission time interval other than the first transmission time interval.

The data transmitting method according to the present disclosure is applied to a communication node of a broadband MESH network. The communication node stores format information of the above data frame, and information of data frame transmission time intervals available to the communication node. The method includes: determining a data frame transmission time interval available to the communication node based on the stored information of data frame transmission time intervals available to the communication node; and transmitting data information in the data frame transmission time interval available to the communication node based on the format information of the data frame. The transmitting data information in the data frame transmission time interval available to the communication node includes: transmitting a pilot signal via a reference signal channel in the data frame transmission time interval available to the communication node.

In an embodiment, in a case that the communication node is a primary node, the first transmission time interval of the data frame serves as the data frame transmission time interval available to the communication node. The transmitting data information in the data frame transmission time interval available to the communication node further includes: transmitting a broadcast signal via a broadcast channel of the data frame transmission time interval available to the communication node.

In an embodiment, the transmitting a broadcast signal via a broadcast channel of the data frame transmission time interval available to the communication node includes: transmitting transmission time interval scheduling information via the broadcast channel of the data frame transmission time interval available to the communication node.

The data transmitting device according to the present disclosure is applied to a communication node of a broadband MESH network. The device includes a data storing unit, an information determining unit and a data transmitting unit. The data storing unit is configured to store format information of the above data frame, and information of data frame transmission time intervals available to the communication node. The information determining unit is configured to determine a data frame transmission time interval available to the communication node based on the stored information of data frame transmission time intervals available to the communication node. The data transmitting unit is configured to transmit data information in the data frame transmission time interval available to the communication node based on the format information of the data frame. In a case of transmitting data information in the data frame transmission time interval available to the communication node, the data transmitting unit is further configured to transmit a pilot signal via a reference signal channel in the data frame transmission time interval available to the communication node.

In an embodiment, in a case that the device is applied to a primary node of the broadband MESH network, the first transmission time interval of the data frame serves as the data frame transmission time interval available to the communication node that is stored in the data storing unit. In a case of transmitting data information in the data frame transmission time interval available to the communication node, the data transmitting unit is further configured to transmit a broadcast signal via the broadcast channel of the data frame transmission time interval available to the communication node.

In an embodiment, in a case of transmitting a broadcast signal via the broadcast channel of the data frame transmission time interval available to the communication node, the data transmitting unit is further configured to transmit transmission time interval scheduling information via the broadcast channel of the data frame transmission time interval available to the communication node.

The data transmitting device according to the present disclosure is applied to a communication node of a broadband MESH network. The device includes a memory and a processor. The memory is connected to the processor and is configured to store a program and data generated by running the program. The processor is configured to perform, by running the program in the memory, the following steps of: storing format information of the above data frame, and information of data frame transmission time intervals available to the communication node; determining a data frame transmission time interval available to the communication node based on the stored information of data frame transmission time intervals available to the communication node; and transmitting data information in the data frame transmission time interval available to the communication node based on the format information of the data frame. The transmitting data information in the data frame transmission time interval available to the communication node includes: transmitting a pilot signal via a reference signal channel in the data frame transmission time interval available to the communication node.

In an embodiment, in a case that the device is applied to a primary node of the broadband MESH network, the first transmission time interval of the data frame serves as the data frame transmission time interval available to the communication node that is stored in the memory. In a case of transmitting data information in the data frame transmission time interval available to the communication node, the processor is further configured to transmit a broadcast signal via a broadcast channel of the data frame transmission time interval available to the communication node.

The data frame according to the present disclosure includes a set number of transmission time intervals, and each of the set number of transmission time intervals includes at least two reference signal channels for transmitting a pilot signal. The first transmission time interval among the set number of transmission time intervals further includes a control channel, a primary synchronization signal channel, a secondary synchronization signal channel, a broadcast channel, a shared channel, and a guard time interval. Each transmission time interval other than the first transmission time interval further includes a control channel, a discovery signal channel, a shared channel and a guard time interval, A second time slot of a last transmission time interval includes an access signal channel. In a case that data is transmitted with the data frame according to the present disclosure, at least two channels can be used to transmit pilot signals in each transmission time interval, such that multiple pilot signals can be transmitted, and positions for transmitting the pilot signals are determined flexibly, which facilitates the communication node to acquire a channel estimation value based on the pilot signals, thereby improving the network mobility. In addition, the data frame according to the present disclosure can be used to transmit a synchronization signal, a discovery signal, and an access signal, such that the data frame supports construction of a synchronous MESH network, which has a smaller network delay than an asynchronous MESH network.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
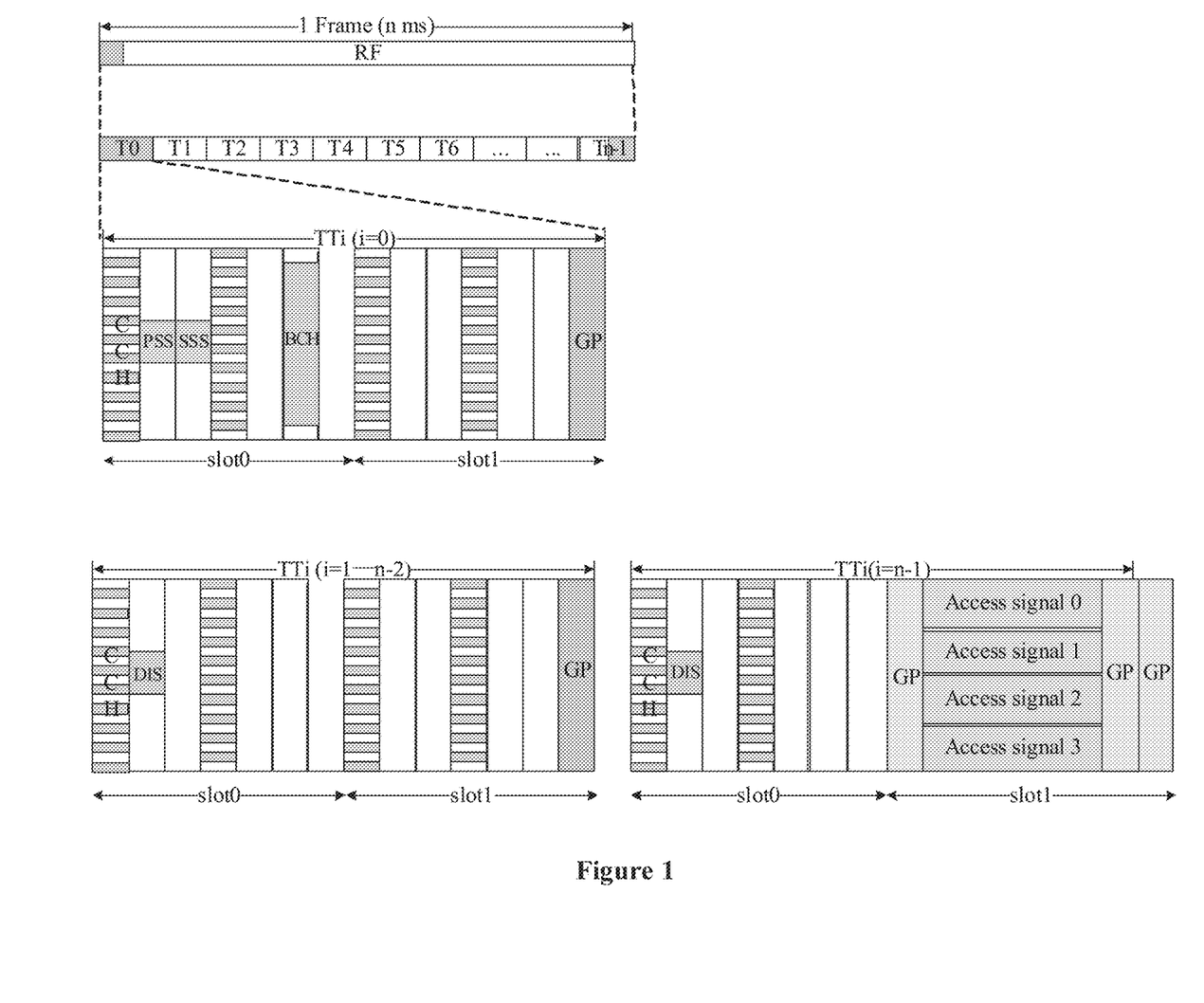
FIG. 1 is a schematic structural diagram showing a data frame according to an embodiment of the present disclosure.

A data frame is provided according to an embodiment of the present disclosure. As shown in FIG. 1, the data frame includes a set number of transmission time intervals. Each of the set number of transmission time intervals includes at least two reference signal channels for transmitting pilot signals.

As shown in FIG. 1, based on a structure of the data frame according to the embodiment of the present disclosure, each data frame has a time length of n milliseconds, and is specifically divided into a set number of transmission time intervals (TTI). In the embodiment of the present disclosure, as shown in FIG. 1, the data frame is divided into n transmission time intervals T0 to Tn−1. Each transmission time interval has a time length of 1 ms. Each TTI includes two time slots. Each of the two time slots has a time length of 0.5 ms. Each TTI corresponds to one transmitting node and multiple receiving nodes. The transmitting node transmits multiple pieces of data in a TTI corresponding to the transmitting node in a frequency division multiplexing manner. Each piece of data corresponds to one receiving node.

The number n of transmission time intervals included in the data frame is limited by the following factors. A first factor is that n should be greater than a maximum number of nodes that the broadband. MESH network can support, to ensure that each node can occupy at least one TTI in each frame to transmit data. A second factor is that if the number n is large, a delay of a multi-hop network is large, a time period required for detecting the synchronization signal is long, and performance is poor, therefore, n is not greater than 20 in principle.

It should be noted that based on the structure of the data frame according to the embodiment of the present disclosure, at least two reference signal (RS) channels are provided in each transmission time interval of the data frame according to the embodiment of the present disclosure, for transmitting pilot signals. In FIG. 1, the reference signal channels are represented by comb-shaped shadows in a first symbol and a fourth symbol of a last TTI and comb-shaped shadows in a first, a fourth, an eighth and an eleventh symbols of other TTIs. Based on the above, each TTI includes at least two RS channels for transmitting the pilot signals. Since each TTI is occupied by one node to transmit data, each node may transmit multiple pilot signals when transmitting data. Compared with the conventional technology, in the present disclosure, a communication node can transmit more pilot signals, positions for transmitting pilot signals are determined more flexibly, such that a node for receiving a data packet can accurately acquire a channel estimation value based on the pilot signals, leading to a high mobility of the broadband MESH network and a large network transmission rate.

A first transmission time interval of the set number of transmission time intervals further includes a control channel, a primary synchronization signal channel, a secondary synchronization signal channel, a broadcast channel, a shared channel, and a guard time interval.

Each transmission time interval other than the first transmission time interval further includes a control channel, a discovery signal channel, a shared channel and a guard time interval. A second time slot of a last transmission time interval includes an access signal channel.

In an embodiment, the first TTI of the data frame according to the embodiment of the present disclosure is usually allocated to a primary node of the broadband MESH network. As shown in FIG. 1, a first transmission time interval T0 (TTi (i=0)) of the data frame further includes a control channel (CCH), a primary synchronization signal (PSS) channel, a secondary synchronization signal (SSS) channel, a broadcast channel (BCH), a shared channel (SCH), and a guard time interval (GP).

The control channel occupies resource units as shown in a shadow part in a first symbol in FIG. 1, and is configured to carry information of a modulation and coding manner of a data channel (a shared channel), a time-frequency resource position of the data channel, a power difference between a pilot signal and a data signal, and the like.

The primary synchronization signal channel is as shown in a shadow part in a second symbol in FIG. 1. The primary node transmits one primary synchronization signal via the PSS channel per frame. Another node other than the primary node acquires a frame boundary of the MESH network based on the received primary synchronization signal.

The secondary synchronization signal channel is as shown in a shadow part in a third symbol in FIG. 1. The primary node transmits one secondary synchronization signal via the SSS channel per frame. The another node other than the primary node acquires an ID number of the MESH network based on the received secondary synchronization signal.

The broadcast channel is as shown in a shadow part in a sixth symbol in FIG. 1. The primary node transmits one broadcast signal via the broadcast channel per frame. The broadcast signal carries basic information of a frame number, a network bandwidth, whether a current network is accessible, and the like.

The shared channel is as shown in a non-shadow part in FIG. 1. The SCH is configured to carry data information, and support QPSK/16QAM/64QAM modulation and diversity and space division multiplexing of a transmitting antenna.

The guard time interval is located in a last symbol of the TTI, as shown in a shadow part of the last symbol in FIG. 1. The guard time interval serves as a guard time interval between two TTIs, and is used for transmission-reception switching, to avoid overlap between data transmissions of two adjacent TTIs.

Accordingly, TTIs other than the first TTI of the data frame according to the embodiment of the present disclosure are respectively allocated to secondary nodes in the broadband MESH network. As shown in FIG. 1, each of the transmission time intervals to Tn−1 (TTi (i=1 to n−1)) of the data frame further includes a control channel (CCH), a discovery signal (DIS) channel, a shared channel (SCH) and a guard time interval (GP).

The control channel is as shown in a non-shadow part of a first symbol in a TTi (i=1 to n−1) in FIG. 1, and is configured to carry information of a modulation and coding mode of a data channel (a shared channel), a time-frequency resource position of the data channel, a power difference between a pilot signal and a data signal, and the like.

The discovery signal channel is as shown in a shadow part of a second symbol in the TTi (i=1 to n−1) in FIG. 1. Each secondary node transmits a discovery signal via the DIS channel of each TTI (where the discovery signal is similar to the primary synchronization signal, and if the primary node already transmits a synchronization signal via the TTI occupied by itself, it is unnecessary for the primary node to transmit the discovery signal). The receiving node acquires a boundary of the TTI at a receiver based on the discovery signal, to determine whether a node in the network is a neighbor node.

The shared channel is as shown in a non-shadow part in the TTi=1 to n−1) in the drawings. The SCH is configured to carry data information, support QPSK/16QAM/64QAM modulation, and transmit antenna diversity and antenna space division multiplexing.

The guard time interval is located in a last symbol of the TTi (i=1 to n−1) in FIG. 1, and is shown in a shadow part of the last symbol of the TTi (i=1 to n−1) in FIG. 1. The guard time interval serves as a guard time interval between two TTIs, and is used for transmission-reception switching, to avoid overlap between data transmissions of two adjacent TTIs.

An access signal channel is located in a second time slot of the last TTI of the data frame, as shown in FIG. 1. Service data is transmitted in a first time slot of the last TTI of one frame, and an access signal is transmitted in a second time slot of the last TTI of the frame. A guard time interval is provided between a time of transmitting the access signal and a time of transmitting the service data, to avoid interference and aliasing between the access signal and the service data. A to-be-accessed network node transmits an access signal via the access signal channel. The primary node determines Whether there is a new node to be accessed based on the access signal, searches for a peak position related to the access signal, and adjusts a frame boundary of an accessed node based on the peak position, such that frame boundaries of all nodes for transmission in the network are synchronized. Specifically, the primary node transmits a synchronization signal PSS/SSS and a broadcast signal in the first TTI. The to-be-accessed network node acquires synchronization information by detecting the PSS/SSS/broadcast signal, and then randomly selects an access signal channel (from multiple frequency-division access signal channels) in a second time slot of a last TTI of a frame and transmits an access signal. The primary node detects the access signal, calculates an advanced time amount, and forwards the advanced time amount to the to-be-accessed network node. Finally, the to-be-accessed network node acquires the same transmission synchronization information as the primary node.

It should further be noted that a length of each symbol, a subcarrier interval, the number of subcarrier resource units, and a length of a cyclic prefix of the data frame according to the embodiment of the present disclosure are the same as that of a frame of an ordinary LTE downlink cyclic prefix, and pilot interval of the data frame according to the embodiment of the present disclosure is set the same as the LIE downlink pilot interval, which is not described in detail herein. Based on the above, when the data frame according to the embodiment of the present disclosure is used to transmit data in the broadband MESH network, the broadband MESH network has performances of the LIE downlink communication network, which include a long signal transmission distance, a high data transmission rate, and a good network mobility. The frame of this structure supports construction of a self-organizing MESH network, and has a corresponding point-to-point peak transmission rate of 70 Mbps (with a bandwidth of 10M).

In addition, the frame structure according to the embodiment of the present disclosure may be used to transmit a synchronization signal, a discovery signal, and an access signal, so that the frame structure supports the synchronous MESH network, Compared with an asynchronous WIFI MESH network based on a competition mechanism, a smaller network delay can be achieved with the synchronous MESH network.

The data frame according to the embodiment of the present disclosure includes a set number of transmission time intervals. Each of the set number of transmission time intervals includes at least two reference signal channels for transmitting pilot signals. The first transmission time interval of the set number of transmission time intervals further includes a control channel, a primary synchronization signal channel, a secondary synchronization signal channel, a broadcast channel, a shared channel, and a guard time interval. Each transmission time interval other than the first transmission time interval further includes a control channel, a discovery signal channel, a shared channel and a guard time interval. A second time slot of a last transmission time interval includes an access signal channel. In a case that data is transmitted with the data frame according to the present disclosure, at least two channels can be used to transmit pilot signals in each transmission time interval, such that multiple pilot signals can be transmitted, and positions for transmitting the pilot signals are determined flexibly, which facilitates the communication node to acquire a channel estimation value based on the pilot signals, thereby improving the network mobility.

In another embodiment of the present disclosure, as shown in FIG. 1, the reference signal channels in the last transmission time interval of the data frame occupy frequency resources in a first symbol and a fourth symbol of the last transmission time interval.

Reference signal channels in each transmission time interval other than the last transmission time interval of the data frame occupy frequency resources in a first symbol, a fourth symbol, an eighth symbol and an eleventh symbol of the transmission time interval other than the first transmission time interval.

In an embodiment of the present disclosure, positions of reference signal channels in each transmission time interval of the data frame are further explained. Each transmission time interval TTI, that is, TTi (i=0 to n−2), other than the last transmission time interval TTI of the data frame shown in FIG. 1 includes two time slots. The two time slots may be both used to transmit data. A second time slot of the last TTI of the data frame serves as the access signal channel, thus only a first time slot is used to transmit data.

In order to ensure that a node for receiving data acquires a channel estimation value based on the pilot signal, multiple reference signal channels are provided in each transmission time interval of the data frame according to the embodiment of the present disclosure. Specifically, two reference signal channels are provided in a second time slot of each transmission time interval TTI. As shown in FIG. 1, a reference signal channel is provided in each of a first symbol, a fourth symbol, an eighth symbol and an eleventh symbol of the transmission time interval TTi (i=0 to n−2). Since the second time slot of the last transmission time interval TTi n−1) serves as the access signal channel and cannot be used to transmit data, reference signal channels are set only in the first symbol and the fourth symbol of the first time slot of the last transmission time interval TTi (i=n−1).

It should be noted that the embodiments of the present disclosure are only described as examples to explain a solution for scheduling time-frequency resources occupied by each reference signal channel when multiple reference signal channels are set in a data frame transmission time interval, With the solution described in the embodiment of the present disclosure, a good communication effect can be obtained in actual application. In actual application, time-frequency resources for each reference signal channel may be flexibly set based on an application scenario and a resource condition. On the premise of setting multiple reference signal channels in the transmission time interval of the data frame, any one of solutions for scheduling the time-frequency resources of the multiple reference signal channels may theoretically be applied in the embodiments of the present disclosure, and should fall within the protection scope of the embodiments of the present disclosure.

In another embodiment of the present disclosure, reference signal channels of the data frame are arranged in a comb-shaped distribution.

Referring to FIG. 1, the reference signal channels in each transmission time interval of the data frame are arranged in a comb-shaped distribution according to an embodiment of the present disclosure. In the symbol where the reference signal channel is located, when transmitting data by a single antenna, one pilot resource unit is set every six resource units in a frequency-domain. When transmitting data by dual antennas, one pilot resource unit is set every three resource units in the frequency-domain.

In another embodiment of the present disclosure, the control channel in the first transmission time interval occupies resource units other than the reference signal channel in the first symbol of the first transmission time interval.

The primary synchronization signal channel occupies a frequency resource in a second symbol of the first transmission time interval.

The secondary synchronization signal channel occupies a frequency resource in a third symbol of the first transmission time interval.

The broadcast channel occupies a frequency resource in a sixth symbol of the first transmission time interval.

The guard time interval in the first transmission time interval occupies a frequency resource in a last symbol of the first transmission time interval.

The shared channel in the first transmission time interval occupies a frequency resource in a symbol remaining in the first transmission time interval.

The control channel in each transmission time interval other than the first transmission time interval occupies resource units other than the reference signal channel in the first symbol of the transmission time interval other than the first transmission time interval.

The discovery signal channel in each transmission time interval other than the first transmission occupies a frequency resource in a second symbol of the transmission time interval other than the first transmission time interval.

The guard time interval in each transmission time interval other than the first transmission time interval occupies a frequency resource in a last symbol of the transmission time interval other than the first transmission time interval.

The shared channel in each transmission time interval other than the first transmission time interval occupies a frequency resource in a symbol remaining in the transmission time interval other than the first transmission time interval.

In the embodiment of the present disclosure, time-domain resources occupied by the control channel, the primary synchronization signal channel, the secondary synchronization signal channel, the broadcast channel, the guard time interval, the shared channel, and the discovery signal channel of the data frame are defined. Time-domain resources are arranged for each channel based on the above, such that each channel can flexibly occupy a frequency-domain resource among the time-domain resources occupied by the channel without affecting a normal communication function.

In another embodiment of the present disclosure, the control channel in the first transmission time interval occupies resource units other than the reference signal channel in the first symbol of the first transmission time interval.

The primary synchronization signal channel occupies 72 resource units in the middle of a second symbol of the first transmission time interval.

The secondary synchronization signal channel occupies 72 resource units in the middle of a third symbol of the first transmission time interval.

The broadcast channel occupies 180 resource units in the middle of a sixth symbol of the first transmission time interval.

The guard time interval in the first transmission time interval occupies all resource units in a last symbol of the first transmission time interval.

The shared channel in the first transmission time interval occupies all resource units in a symbol remaining in the first transmission time interval.

The control channel in each transmission time interval other than the first transmission time interval occupies resource units other than the reference signal channel in a first symbol of the transmission time interval other than the first transmission time interval.

The discovery signal channel in each transmission time interval other than the first transmission occupies 72 resource units in the middle of a second symbol of the transmission time interval other than the first transmission time interval.

The guard time interval in each transmission time interval other than the first transmission time interval occupies all resource units in a last symbol of the transmission time interval other than the first transmission time interval.

The shared channels in each transmission time interval other than the first transmission time interval occupies all resource units in a symbol remaining in the transmission time interval other than the first transmission time interval.

In this embodiment, time-frequency resources occupied by channels are configured and arranged. The control channel CCH is configured to occupy the same time-domain resource as the reference signal channel. In the frequency-domain, when transmitting by a single antenna, a pilot resource unit is arranged as a reference signal channel every 6 resource units in the frequency-domain. When transmitting by dual antennas, a pilot resource unit is arranged as a reference signal channel every 3 resource units in the frequency-domain. The remaining resource unit is used for the control channel CCH.

It should be noted that the embodiment of the present disclosure only illustrates specific configuration of the time-frequency resources of each channel rather than limiting the time-frequency resources occupied by each channel in the data frame according to the embodiment of the present disclosure. In actual application, based on the configuration of time-frequency resources of each channel of the data frame according to the embodiment of the present disclosure, the time-frequency resources occupied by each channel can be flexibly adjusted.

A data transmitting method is provided according to an embodiment of the present disclosure, which is applied to a communication node of a broadband MESH network. The communication node stores format information of the data frame according to any one of the above embodiments, and information of data frame transmission time intervals available to the communication node.

In the embodiment of the present disclosure, the format information of the data frame according to any one of the above embodiments stored in the communication node in the broadband MESH network includes information of time-frequency resources occupied by each channel of the data frame. In addition, the data frame according to the above embodiments includes the set number of transmission time intervals, and each transmission time interval is allocated to a communication node for data transmission. Therefore, the communication node in the network is required to further store information of data frame transmission time intervals available to the communication node. That is, the communication node is required to determine which transmission time interval can be occupied by the communication node for data transmission.

Figure 2:
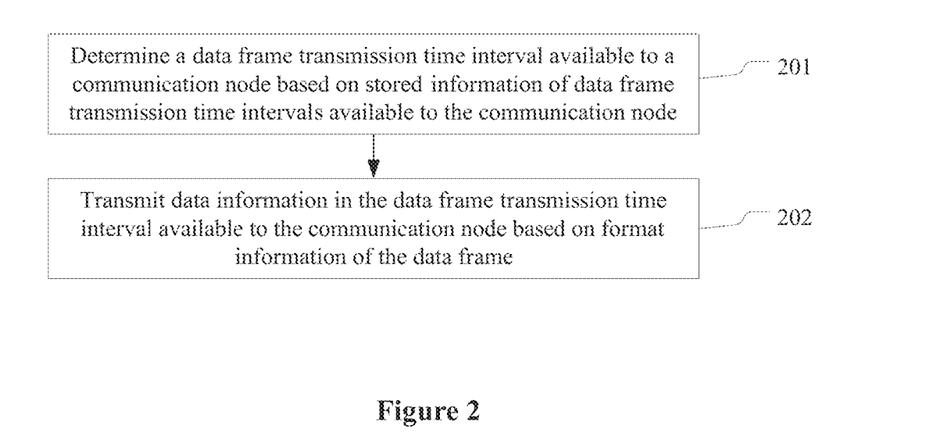
FIG. 2 is a schematic flowchart showing a data transmitting method according to an embodiment of the present disclosure.

As shown in FIG. 2, the data transmitting method according to the embodiment of the present disclosure includes the following steps S201 to S202.

In step S201, the communication node determines a data frame transmission time interval available to the communication node based on the stored information of data frame transmission time intervals available to the communication node.

Specifically, in the broadband MESH network, allocation of transmission time intervals of a data frame is performed by a network system, and is broadcasted by a primary node of the network. After receiving a broadcast, each secondary node stores information of transmission time intervals available to the secondary node, and occupies the transmission time intervals sequentially based on the allocation. Therefore, when being to transmit data, the communication node is required to first determine which transmission time interval can be occupied by the communication node for data transmission based on the stored information of data frame transmission time intervals available to the communication node, so as to avoid collision with other nodes.

It should be understood that if each node in the broadband MESH network occupies a fixed transmission time interval to transmit data, information of data frame transmission time intervals available to a communication node that is stored and acquired by the communication node is fixed, and a transmission time interval occupied by the communication node for each communication is also fixed. In this case, when transmitting data, the communication node may skip step S201 and directly perform step S202.

In step S202, based on the format information of the data frame, the communication node transmits data information in the data frame transmission time interval available to the communication node. The process of transmitting data information in the data frame transmission time interval available to the communication node includes: transmitting a pilot signal in a reference signal channel in the data frame transmission time interval available to the communication node.

After determining a transmission time interval allocated to the communication node, the communication node transmits data in the transmission time interval. Specifically, the communication node transmits data via corresponding channels of the transmission time interval occupied by the communication node.

It should be noted that when transmitting data, the communication node further transmits a pilot signal via a reference signal channel. In addition, in order to ensure that a data receiver accurately acquires a channel estimation value based on the received data to improve network mobility, the communication node transmits pilot signals via multiple reference signal channels as much as possible when transmitting data. The specific number of pilot signals to be transmitted is determined through negotiation between two communication parties.

The data transmitting method according to the embodiment of the present disclosure is applied to a communication node of a broadband MESH network. The communication node stores format information of the data frame according to any one of the above embodiments, and information of data frame transmission time intervals available to the communication node. The method includes: determining a data frame transmission time interval available to the communication node based on the stored information of data frame transmission time intervals available to the communication node; and transmitting data information in the data frame transmission time interval available to the communication node based on the format information of the data frame. The transmitting data information in the data frame transmission time interval available to the communication node includes: transmitting a pilot signal via a reference signal channel in the data frame transmission time interval available to the communication node. With the above technical solution, the communication node transmits data based on the format of the data frame according to the above embodiments. Multiple pilot signals can be transmitted in one data packet, thereby improving the network mobility.

In another embodiment of the present disclosure, in a case that the communication node is a primary node, the first transmission time interval of the data frame serves as the data frame transmission time interval available to the communication node. The transmitting data information in the data frame transmission time interval available to the communication node further includes: transmitting a broadcast signal via a broadcast channel of the data frame transmission time interval available to the communication node.

Since the first transmission time interval of the data frame according to the above embodiments includes a synchronization signal channel, the first transmission time interval is usually allocated to the primary node in the broadband MESH network. That is, the primary node in the broadband MESH network occupies the first transmission time interval of the data frame. When transmitting data, the primary node may transmit a broadcast signal via a broadcast channel of the transmission time interval occupied by the primary node. Specifically, information carried in the broadcast signal is system setting information, such as information of a channel carrying frame number, a network bandwidth, and whether a current network is accessible. The primary node transmits the system setting information to all nodes in the network through the broadcast signal.

In another embodiment of the present disclosure, the transmitting a broadcast signal via a broadcast channel of the data frame transmission time interval available to the communication node includes: transmitting transmission time interval scheduling information via the broadcast channel of the data frame transmission time interval available to the communication node.

The network system may further dynamically allocate data frame transmission time intervals of the data frame according to the above embodiments. That is, the network system dynamically allocates transmission time intervals to communication nodes. Then, the system transmits allocation information to each node of the network via the broadcast channel occupied by the primary node, to overall control of the network.

Figure 3:
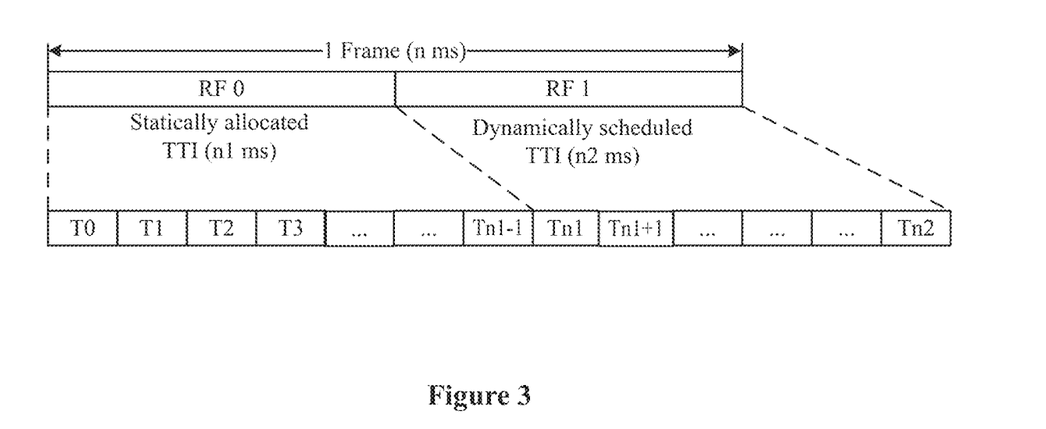
FIG. 3 is a schematic diagram showing a division of transmission time intervals for a data frame according to an embodiment of the present disclosure.

For example, referring to FIG. 3, one data frame includes n TTIs, where first n1 TTIs are statically allocated TTIs. A statically allocated TTI refers that the network already allocates in advance the TTI to a certain MESH node. A necessary signaling message that maintains the network and a network delay-sensitive service are usually transmitted in the statically allocated TTI. With the statically allocated TTI, the signaling message and network delay-sensitive service can be transmitted in time. The remaining TTIs in the data frame other than the statically allocated TTIs are dynamically scheduled TTIs. The primary node dynamically schedules TTI resources for the network nodes based on a cache state report reported by the secondary node. A data flow service is usually transmitted in a dynamically scheduled TTI.

Figure 4:
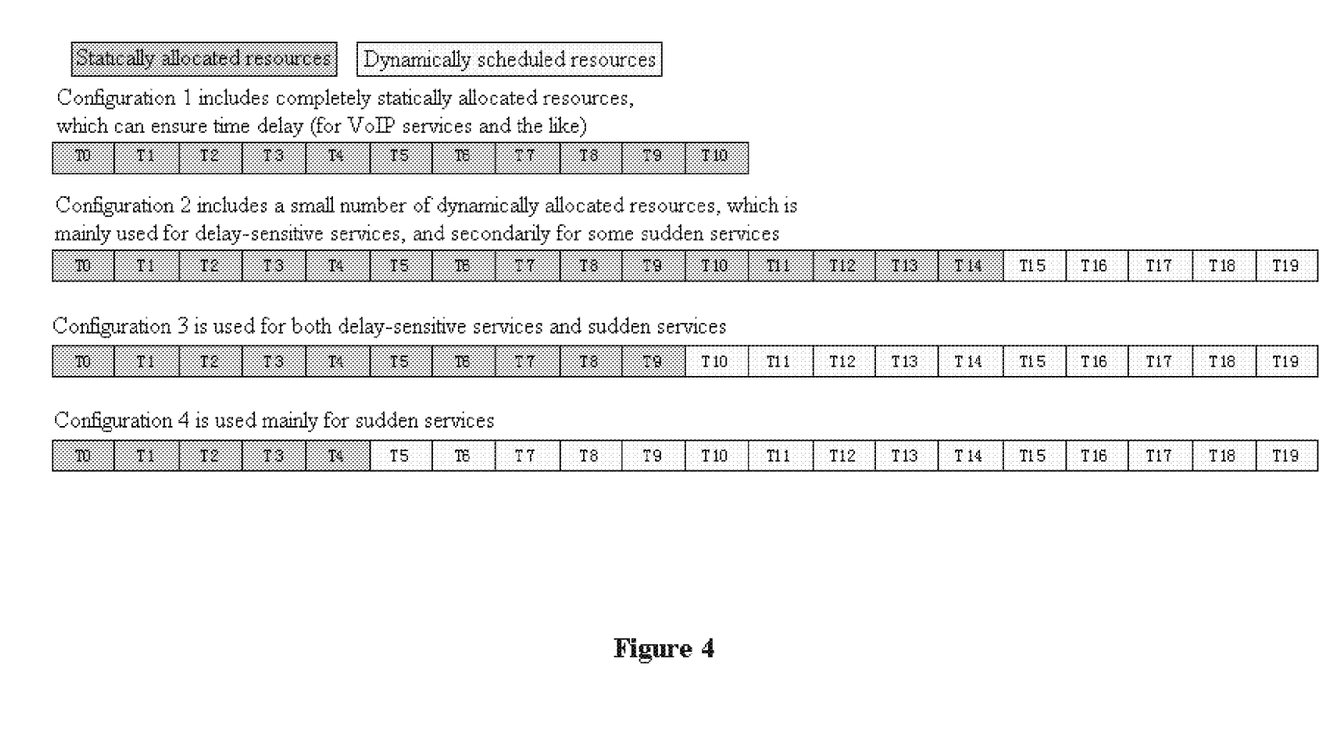
FIG. 4 is a schematic diagram showing configurations of transmission time intervals for a data frame according to an embodiment of the present disclosure.

According to different actual application scenarios of the broadband MESH network, n, n1, and n2 may be flexibly configured. A configuration process is similar to an LTE TDD uplink and downlink matching process. A typical allocation scenario is as shown in FIG. 4, where different configuration correspond to different communication scenarios.

Based on the above, when being to schedule transmission time intervals of the data frame, the network system transmits the scheduling information to the primary node of the network. The primary node of the network broadcasts the scheduling information via the broadcast channel, so that all nodes in the network acquire the scheduling information, and occupy respective transmission time intervals based on the scheduling information.

Based on the above process, the frame structure applied in the embodiments of the present disclosure is applicable to various application scenarios. For example, only by adjusting time interval allocation of the frame structure, the frame structure can applied to a service scenario that requires a low network delay, or a service scenario that requires a large number of nodes in the network and supports multiple data flows. The frame structure in the embodiments of the present disclosure has a wide application range.

A data transmitting device is provided according to an embodiment of the present disclosure, which is applied to a communication node of a broadband MESH network. As show in FIG. 5, the device includes a data storing unit 501, an information determining unit 502 and a data transmitting unit 503.

Figure 5:
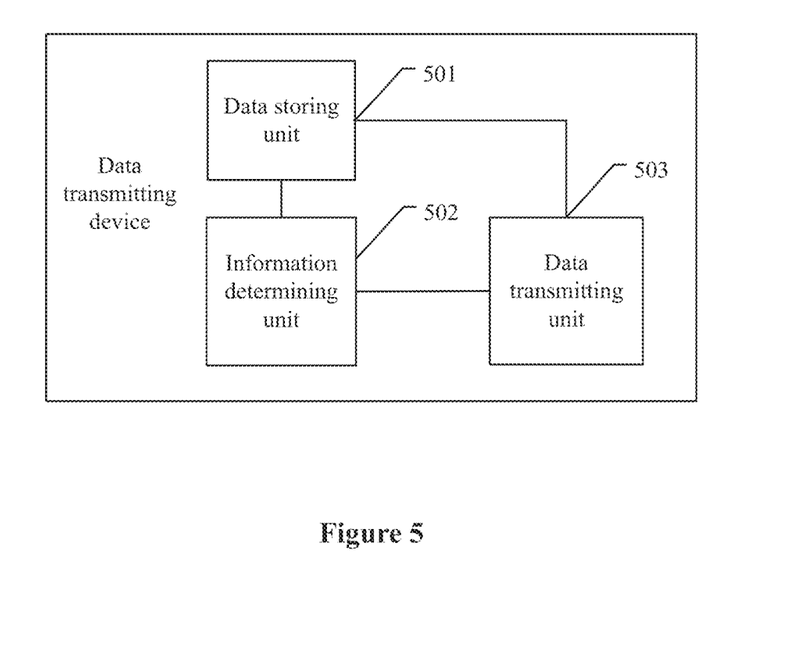
FIG. 5 is a schematic structural diagram showing a data transmitting device according to an embodiment of the present disclosure.

The data storing unit 501 is configured to store format information of the data frame according to the above embodiments, and information of data frame transmission time intervals available to the communication node.

The information determining unit 502 is configured to determine a data frame transmission time interval available to the communication node based on the stored information of data frame transmission time intervals available to the communication node.

The data transmitting unit 503 is configured to transmit data information in the data frame transmission time interval available to the communication node based on the format information of the data frame. In a case of transmitting data information in the data frame transmission time interval available to the communication node, the data transmitting unit is further configured to transmit a pilot signal via a reference signal channel in the data frame transmission time interval available to the communication node.

For specific operation of each unit in this embodiment, reference may be made to the method embodiments, which is not repeated here.

The data transmitting device according to the embodiment of the present disclosure is applied to a communication node of a broadband MESH network. The data storing unit 501 stores format information of the data frame according to the above embodiments, and information of data frame transmission time intervals available to the communication node. When transmitting data, the information determining unit 502 first determines a data frame transmission time interval available to the communication node based on the stored information of data frame transmission time intervals available to the communication node. Then, the data transmitting unit 503 transmits data information in the data frame transmission time interval available to the communication node based on the format information of the data frame. In a case of transmitting data information in the data frame transmission time interval available to the communication node, the data transmitting unit is further configured to transmit a pilot signal via a reference signal channel in the data frame transmission time interval available to the communication node. With the above technical solution, the communication node transmits data based on the format of the data frame according to the above embodiments, such that multiple pilot signals can be transmitted in one data packet, thereby improving the network mobility.

In another embodiment of the present disclosure, in a case that the device is applied to a primary node of the broadband MESH network, the first transmission time interval of the data frame serves as the data frame transmission time interval available to the communication node that is stored in the data storing unit 501. In a case of transmitting data information in the data frame transmission time interval available to the communication node, the data transmitting unit 503 is further configured to transmit a broadcast signal via a broadcast channel of the data frame transmission time interval available to the communication node.

For specific operation of the data transmitting unit 503 in this embodiment, reference may be made to the method embodiments, which is not repeated here.

In another embodiment of the present disclosure, in the case of transmitting a broadcast signal via the broadcast channel of the data frame transmission time interval available to the communication node, the data transmitting unit 503 is further configured to transmit transmission time interval scheduling information via the broadcast channel of the data frame transmission time interval available to the communication node.

For specific operation of the data transmitting unit 503 in this embodiment, reference may be made to the method embodiments, which is not repeated here.

Figure 6:
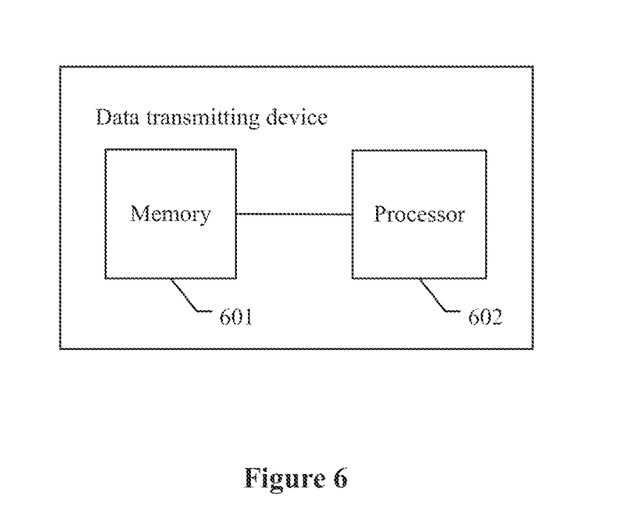
FIG. 6 is a schematic structural diagram showing a data transmitting device according to another embodiment of the present disclosure.

A data transmitting device is further provided according to an embodiment of the present disclosure, which is applied to a communication node of a broadband MESH network. As shown in FIG. 6, the device includes a memory 601 and a processor 602.

The memory 601 is connected to the processor 602 and is configured to store a program and data generated by running the program.

The processor 602 is configured to perform, by running the program in the memory 601, the following steps of: storing format information of the above data frame according to the above embodiments, and information of data frame transmission time intervals available to the communication node; determining a data frame transmission time interval available to the communication node based on the stored information of data frame transmission time intervals available to the communication node; and transmitting data information in the data frame transmission time interval available to the communication node based on the format information of the data frame. The transmitting data information in the data frame transmission time interval available to the communication node includes: transmitting a pilot signal via a reference signal channel in the data frame transmission time interval available to the communication node.

The data transmitting device according to the embodiment of the present disclosure is applied to a communication node of a broadband MESH network. The processor 602 stores format information of the above data frame according to the above embodiments, and information of data frame transmission time intervals available to the communication node. When transmitting data, the processor 602 first determines a data frame transmission time interval available to the communication node based on the stored information of data frame transmission time intervals available to the communication node. Then, the processor 602 transmits data information in the data frame transmission time interval available to the communication node based on the format information of the data frame. In a case of transmitting data information in the data frame transmission time interval available to the communication node, the processor is further configured to transmit a pilot signal via a reference signal channel in the data frame transmission time interval available to the communication node. With the above technical solution, the communication node transmits data based on the format of the data frame according to the above embodiments, such that multiple pilot signals can be transmitted in one data packet, thereby improving the network mobility.

In another embodiment of the present disclosure, in a case that the device is applied to a primary node of the broadband MESH network, the first transmission time interval of the data frame serves as the data frame transmission time interval available to the communication node that is stored in the memory 602. In a case of transmitting data information in the data frame transmission time interval available to the communication node, the processor 602 is further configured to transmit a broadcast signal via the broadcast channel of the data frame transmission time interval available to the communication node.

For specific operation of the processor 602 in this embodiment, reference may be made to the method embodiments, which is not repeated here.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A data transmitting method applied to a communication node of a broadband MESH network, wherein the communication node stores format information of a data frame, and information of data frame transmission time intervals available to the communication node, and the data frame comprises a set number of transmission time intervals each comprising at least two reference signal channels for transmitting pilot signals, wherein in the set number of transmission time intervals, a first transmission time interval further comprises a control channel, a primary synchronization signal channel, a secondary synchronization signal channel, a broadcast channel, a shared channel, and a guard time interval; and each transmission time interval other than the first transmission time interval further comprises a control channel, a discovery signal channel, a shared channel and a guard time interval, and wherein a second time slot of a last transmission time interval comprises an access signal channel, and the method comprises:
   determining a data frame transmission time interval available to the communication node based on the stored information of data frame transmission time intervals available to the communication node; and
   transmitting data information in the data frame transmission time interval available to the communication node based on the format information of the data frame, wherein the transmitting data information in the data frame transmission time interval available to the communication node comprises: transmitting a pilot signal via a reference signal channel in the data frame transmission time interval available to the communication node.

2. The method according to claim 1, wherein
   in a case that the communication node is the primary node, the first transmission time interval of the data frame serves as the data frame transmission time interval available to the communication node, and
   the transmitting data information in the data frame transmission time interval available to the communication node further comprises:

transmitting a broadcast signal via a broadcast channel of the data frame transmission time interval available to the communication node.

3. The method according to claim 2, wherein the transmitting a broadcast signal via a broadcast channel of the data frame transmission time interval available to the communication node comprises:
   transmitting transmission time interval scheduling information via the broadcast channel of the data frame transmission time interval available to the communication node.

4. The data transmitting method according to claim 1, wherein
   the reference signal channels in the last transmission time interval of the data frame occupy frequency resources in a first symbol and a fourth symbol of the last transmission time interval; and
   the reference signal channels in each transmission time interval other than the last transmission time interval of the data frame occupy frequency resources in a first symbol, a fourth symbol, an eighth symbol and an eleventh symbol of the transmission time interval other than the last transmission time interval.

5. The data transmitting method according to claim 4, wherein reference signal channels of the data frame are arranged in a comb-shaped distribution.

6. The data transmitting method according to claim 4, wherein
   the control channel in the first transmission time interval occupies resource units other than the reference signal channels in the first symbol of the first transmission time interval;
   the primary synchronization signal channel occupies a frequency resource in a second symbol of the first transmission time interval;
   the secondary synchronization signal channel occupies a frequency resource in a third symbol of the first transmission time interval;
   the broadcast channel occupies a frequency resource in a sixth symbol of the first transmission time interval;
   the guard time interval in the first transmission time interval occupies a frequency resource in a last symbol of the first transmission time interval;
   the shared channel in the first transmission time interval occupies a frequency resource in a symbol remaining in the first transmission time interval;
   the control channel in each transmission time interval other than the first transmission time interval occupies resource units other than the reference signal channels in the first symbol of the transmission time interval other than the first transmission time interval;
   the discovery signal channel in each transmission time interval other than the first transmission time interval occupies a frequency resource in a second symbol of the transmission time interval other than the first transmission time interval;
   the guard time interval in each transmission time interval other than the first transmission time interval occupies a frequency resource in a last symbol of the transmission time interval other than the first transmission time interval; and
   the shared channel in each transmission time interval other than the first transmission time interval occupies a frequency resource in a symbol remaining in the transmission time interval other than the first transmission time interval.

7. A data transmitting device applied to a communication node of a broadband MESH network, the device comprising a memory and a processor, wherein
   the memory is connected to the processor and is configured to store a program and data generated by running the program, and
   the processor is configured to perform, by running the program in the memory, the following steps of:
   storing format information of a data frame, and information of data frame transmission time intervals available to the communication node, wherein the data frame comprises a set number of transmission time intervals each comprising at least two reference signal channels for transmitting pilot signals, and in the set number of transmission time intervals, a first transmission time interval further comprises a control channel, a primary synchronization signal channel, a secondary synchronization signal channel, a broadcast channel, a shared channel, and a guard time interval; and each transmission time interval other than the first transmission time interval further comprises a control channel, a discovery signal channel, a shared channel and a guard time interval, and wherein a second time slot of a last transmission time interval comprises an access signal channel;
   determining a data frame transmission time interval available to the communication node based on the stored information of data frame transmission time intervals available to the communication node; and
   transmitting data information in the data frame transmission time interval available to the communication node based on the format information of the data frame, and wherein
   the transmitting data information in the data frame transmission time interval available to the communication node comprises:
   transmitting a pilot signal via a reference signal channel in the data frame transmission time interval available to the communication node.

8. The device according to claim 7, wherein
   in a case that the device is applied to a primary node of the broadband MESH network, the first transmission time interval of the data frame serves as the data frame transmission time interval available to the communication node that is stored in the memory, and wherein
   in a case of transmitting data information in the data frame transmission time interval available to the communication node, the processor is further configured to transmit a broadcast signal via a broadcast channel of the data frame transmission time interval available to the communication node.

9. The data transmitting device according to claim 7, wherein
   the reference signal channels in the last transmission time interval of the data frame occupy frequency resources in a first symbol and a fourth symbol of the last transmission time interval; and
   the reference signal channels in each transmission time interval other than the last transmission time interval of the data frame occupy frequency resources in a first symbol, a fourth symbol, an eighth symbol and an eleventh symbol of the transmission time interval other than the last transmission time interval.

10. The data transmitting device according to claim 9, wherein reference signal channels of the data frame are arranged in a comb-shaped distribution.

11. The data transmitting device according to claim 9, wherein the control channel in the first transmission time interval occupies resource units other than the reference signal channels in the first symbol of the first transmission time interval;

the primary synchronization signal channel occupies a frequency resource in a second symbol of the first transmission time interval;

the secondary synchronization signal channel occupies a frequency resource in a third symbol of the first transmission time interval;

the broadcast channel occupies a frequency resource in a sixth symbol of the first transmission time interval;

the guard time interval in the first transmission time interval occupies a frequency resource in a last symbol of the first transmission time interval;

the shared channel in the first transmission time interval occupies a frequency resource in a symbol remaining in the first transmission time interval;

the control channel in each transmission time interval other than the first transmission time interval occupies resource units other than the reference signal channels in the first symbol of the transmission time interval other than the first transmission time interval;

the discovery signal channel in each transmission time interval other than the first transmission time interval occupies a frequency resource in a second symbol of the transmission time interval other than the first transmission time interval;

the guard time interval in each transmission time interval other than the first transmission time interval occupies a frequency resource in a last symbol of the transmission time interval other than the first transmission time interval; and the shared channel in each transmission time interval other than the first transmission time interval occupies a frequency resource in a symbol remaining in the transmission time interval other than the first transmission time interval.

\* \* \* \* \*